(12) United States Patent
Chen et al.

(10) Patent No.: US 6,901,799 B2
(45) Date of Patent: Jun. 7, 2005

(54) VIBRATORY DOUBLE-AXIALLY SENSING MICRO-GYROSCOPE

(75) Inventors: Yi-Ru Chen, YunLin (TW); Kai-Cheng Chang, Taipei (TW); Guang-Chyeng Fang, Hsinchu (TW); Ming-Hsiu Hsu, NanTou (TW); Pei-Fang Liang, YunLin (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 10/699,869

(22) Filed: Nov. 4, 2003

(65) Prior Publication Data

US 2005/0016270 A1 Jan. 27, 2005

(30) Foreign Application Priority Data

Jul. 25, 2003 (TW) ........................................ 92120314 A

(51) Int. Cl.[7] ................................................. G01P 9/04
(52) U.S. Cl. .................................. 73/504.13; 73/504.02
(58) Field of Search ......................... 73/504.02, 504.04, 73/504.12, 504.13, 504.15

(56) References Cited

U.S. PATENT DOCUMENTS

| | | | | |
|---|---|---|---|---|
| 4,499,778 A | * | 2/1985 | Westhaver et al. ............ | 74/5 F |
| 4,644,793 A | * | 2/1987 | Church .................... | 73/504.13 |
| 5,915,276 A | * | 6/1999 | Fell ........................ | 73/504.13 |
| 6,282,958 B1 | * | 9/2001 | Fell et al. ................. | 73/504.13 |
| 6,539,804 B1 | * | 4/2003 | Iwata ....................... | 73/504.13 |

* cited by examiner

Primary Examiner—Helen Kwok
(74) Attorney, Agent, or Firm—Birch, Stewart, Kolasch & Birch, LLP

(57) ABSTRACT

The invention is to provide a vibratory double-axially sensing micro-gyroscope, which includes a base, on center of which a supporting hub is arranged, and plural suspending arms are extended outwardly with equal altitude and in radial direction from the supporting hub and, at the outside end of the suspending arm, a platform is formed, and a capacitance sensing electrode or a static-electricity driving electrode is plated respectively at each side of the platform top, below which a static-electricity driving electrode or a capacitance sensing electrode is arranged; take a preferred embodiment of the present invention for example, if the capacitance sensing electrode is arranged at top of the platform and the static-electricity driving electrode is arranged below the platform, then the suspending arm and the platform will vibrate vertically by the attraction of the static-electricity when applying driving voltage, and the vibratory phase difference between two adjacent suspending arms and the platform is 180 degrees; when the gyroscope is rotated horizontally, the suspending arm and the platform will generate horizontal displacement caused by Coriolis force and, by measuring the change of capacitance value, the magnitude of the angular velocity of vibration is obtained; since its structure has symmetrical property, so it has sensing ability in both X or Y axes and, because it has superior stability and is able to resist environment noise and vibration, its sensing capability is enhanced and, since its machining method is simple, so it is adapted for mass production for having lower manufacturing cost.

20 Claims, 7 Drawing Sheets

VIBRATORY DOUBLE-AXIALLY SENSING MICRO-GYROSCOPE

This Nonprovisional application claims priority under 35 U.S.C. §119(a) on Patent Application No(s). 092120314 filed in TAIWAN on Jul. 25, 2003, the entire contents of which are hereby incorporated by reference.

FIELD OF THE INVENTION

The invention relates to a vibratory double-axially sensing micro-gyroscope, and in particular to a static-electricity driving harmonic gyroscope that is belonged to beam type, symmetrically structured, and capable of double-axial sensing in X or Y direction.

BACKGROUND OF THE INVENTION

Gyroscope, an apparatus applying inertia principle to measure rotary angle or angular velocity, is mainly applied in the guidance of military, aviation, and navigation, etc. According to operational principle, gyroscope may be divided to two kinds: rotor-typed gyroscope and vibratory gyroscope driven by static electricity.

As shown in FIG. 1, which is a single-axial beam-typed gyroscope (U.S. Pat. No. 4,499,778: Flexure Mount Assembly for A Dynamically Tuned Gyroscope and Method of Manufacturing Same). Said gyroscope 10 is a traditional beam-typed rotary gyroscope, which is capable of single-axial measurement and assembled by plural machined elements 16, 18. Traditional rotor-typed gyroscope 10 is designed by applying the conservation principle of angular momentum so as to obtain the angular speed of rotation, so there are many problems involving complicated structures and bearing friction, such that there are many shortcoming existing in traditional gyroscope, such as: expansive price, heavy weight, and short lifetime, etc.

Different from the design principle of traditional rotor-typed gyroscope, the vibratory gyroscope is designed by the vibration principle of an elastic body; that is, two vibration modes, originally possessed by the gyroscope configuration, normal to each other and having same frequency, are applied as the driving and sensing models for enhancing the system's sensitivity. Since the structure of said vibratory gyroscope is simple and without moving element, such as: bearing, so it is extremely suitable for mass production with micro-machining technique so as to lower down the manufacturing cost. Therefore, since the vibratory micro-gyroscope has the advantages of low cost, superior performance and microscopic size, so it has been gradually applied in wide field. Besides, the vibratory micro-gyroscope is designed by the signal noise ratio of signal checking-out circuit and by the optimal configuration, so it has high-classed sensitivity to have the potential in becoming commercialized sensing element.

As shown in FIG. 2, which is a ring-typed vibratory gyroscope 20 (U.S. Pat. No. 5,450,751: Microstructure for Vibratory Gyroscope). The vibratory gyroscope 20 is arranged in a base 22 and is comprised of ring 24, hub 25 and plural semi-supporting spoke 26 distributed in equal distance and in radial direction. There are plural charge conductive sites 23 arranged around the circumference of the ring 24. The ring 24 and spoke 26 are all manufactured by the Micro Electric Mechanical System (MEMS) technology with high aspect ratio. The structural altitudes of both the ring 24 and the spoke 26 are same. Each different zones of the ring 24 provides the needed inducing area to the vibratory gyroscope 20 as static-electricity driving and capacitance sensing electrodes. Its inducting manner is accomplished by the inter-induction between the different sections of the ring 24 and the plural sensing/driving electrodes 23.

Again, please refer to FIG. 3, which is a ring-typed vibratory gyroscope 30 (U.S. Pat. No. 5,547,093: Method of Forming A Micromachine Motion Sensor), of which structure is same as that of the vibratory gyroscope 20 shown in FIG. 2, and which includes an ring 34, center post 35, and plural arcuate springs 36 distributed in equal distance and in radial direction. There are plural electrodes 33 arranged around the circumference of the ring 34. The ring 34 and arcuate springs 36 are all manufactured by the MEMS technology with high aspect ratio. The structural altitudes of both the ring 34 and the arcuate springs 36 are same. Each different zones of the ring 34 provides the needed inducing area to the vibratory gyroscope 30 as static-electricity driving and capacitance sensing electrodes. Its inducting manner is accomplished by the inter-induction between the different sections of the ring 34 and the plural sensing/driving electrodes 33.

Furthermore, please refer to FIG. 4, which shows a suspending-beam-typed vibratory gyroscope 40 (U.S. Pat. No. 4,381,672: Vibration Beam Rotation Sensor), which is machined and manufactured by MEMS technology, and which mainly includes a suspending arm beam 41 that is arranged on base electrode 42. There are beam electrodes 43 covered at the bottom and the side edge of the suspending arm beam 41. Oscillator circuit 44 drives voltage between the base electrode 42 and the beam electrode 43 to make the suspending arm beam 41 first generate vertical reciprocating motion in up and down directions, and the suspending arm structure is then converted to horizontal vibration operated by Coriolis force. The pressure sensing devices arranged at two sides of the suspending arm beam 41 senses the horizontal vibration distance to obtain the acceleration value of the rotating angle.

In summarizing each ring-typed vibratory gyroscope shown from FIG. 2 through FIG. 4, it may find that the rings 24, 34 of the vibratory gyroscopes 20, 30 and the sensing electrodes must adopt particular manufacturing process of high aspect ration of twenty. This design can not be fulfilled by common MEMS technology. In addition, since the activation of the vibratory gyroscope is driven and sensed by two coplanar elliptic modes, of which phases are differentiated by 45 degrees, so the aforementioned gyroscopes 20, 30, 40 are all used for single-axial sensing only.

SUMMARY OF THE INVENTION

According to the aforementioned shortcomings of the prior arts, the main objective of the invention is to provide a vibratory double-axially sensing micro-gyroscope, structure of which is beam-typed and symmetrical, so the invention has double-axial sensing capability in both X direction and Y direction.

The secondary objective of the invention is to provide a vibratory double-axially sensing micro-gyroscope, which is beam-typed and has symmetrical structure and, since the invention is stable and has excellent resistance to environmental noise and vibration, so the sensing ability is enhanced.

Another objective of the invention is to provide a vibratory double-axially sensing micro-gyroscope, which is adapted for mass production with MEMS technology, such that the cost may be lowered down.

Further another objective of the invention is to provide a vibratory double-axially sensing micro-gyroscope, which is characterized by having a sensing mode frequency that is close to driving mode frequency, such that the sensing sensitivity is enhanced.

Following drawings are cooperated to describe the detailed structure and its connective relationship according to the invention for facilitating your esteemed members of reviewing committee in understanding the characteristics and the objectives of the invention.

DETAILED DESCRIPTION OF THE INVENTION

Figure 1:
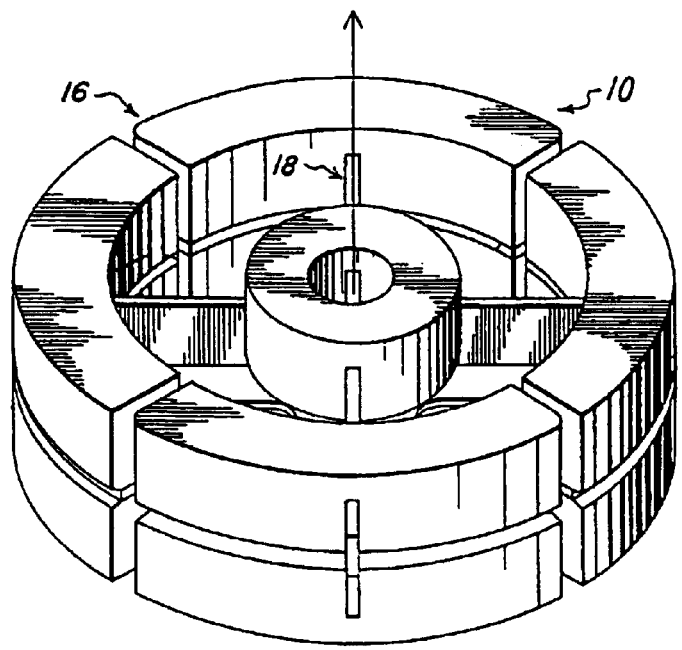
FIG. 1 is an outer-appearance view for a single-axially sensing beam-typed gyroscope according to the prior arts.
Figure 4:
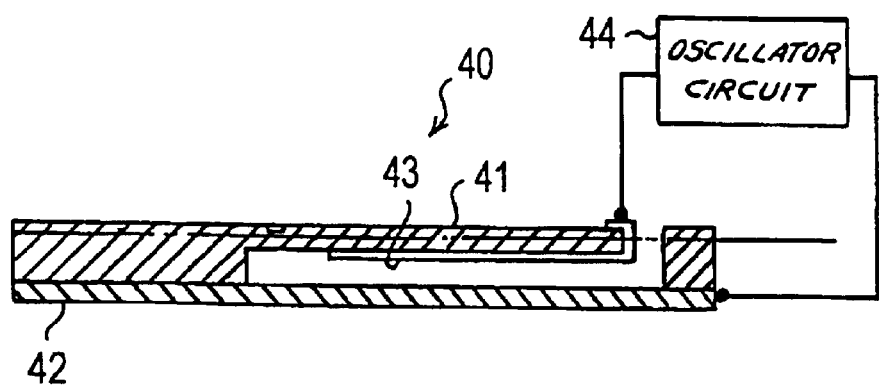
FIG. 4 is a structural illustration for the suspending-arm-beam-typed vibratory gyroscope according to the prior arts.
Figure 2:
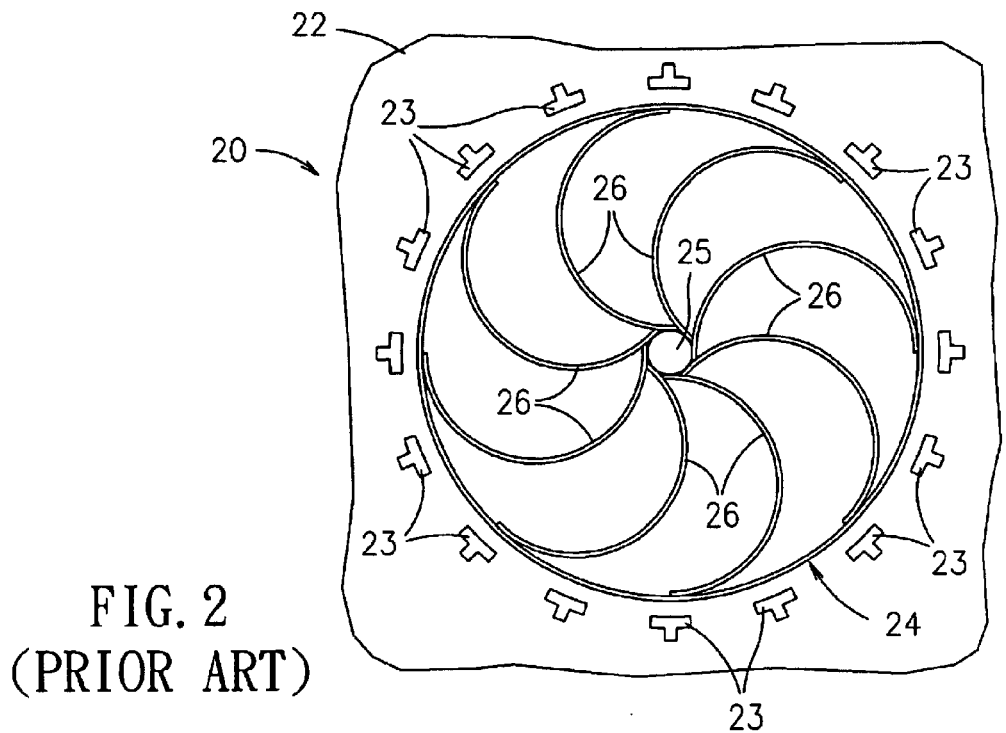
FIG. 2 and FIG. 3 are structural illustrations for the ring-typed vibratory gyroscope according to the prior arts.
Figure 3:
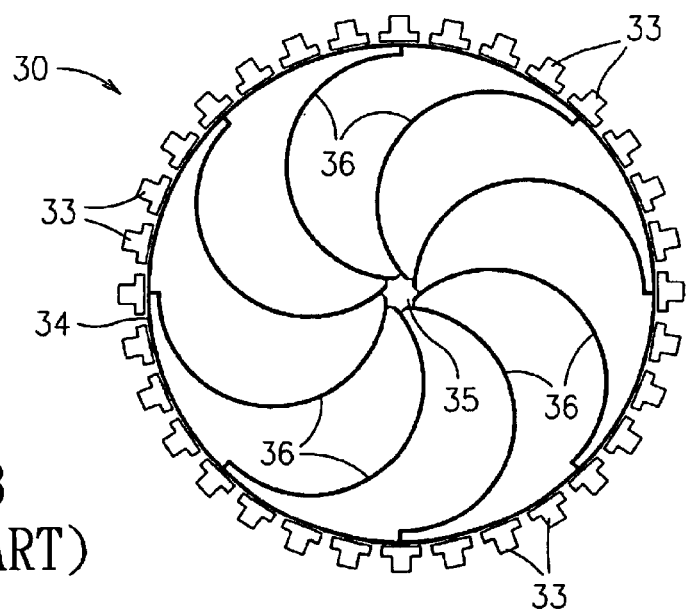
Figure 5:
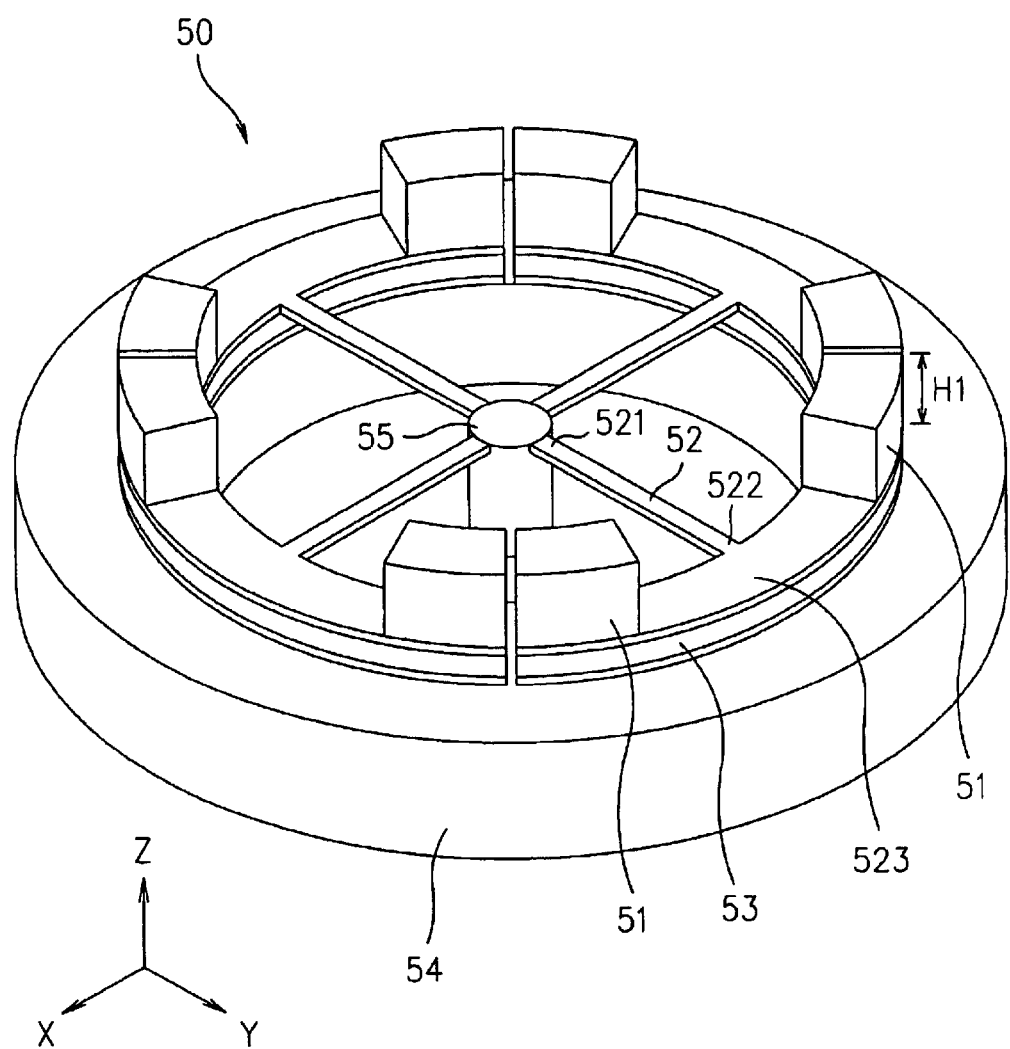
FIG. 5 is a stereo outer-appearance view for a preferable embodiment according to the present invention.
Figure 6:
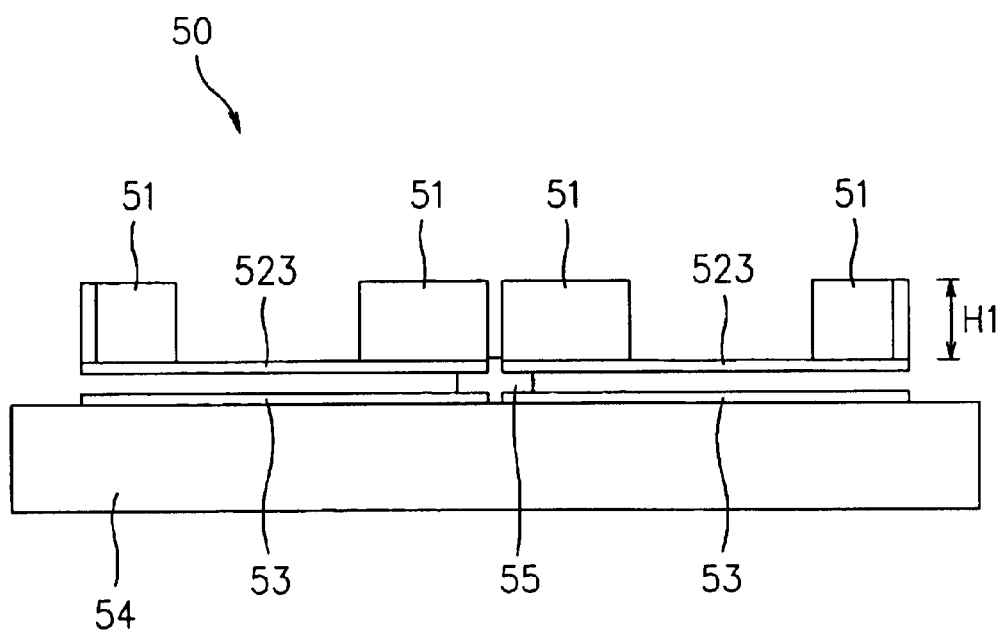
FIG. 6 is a front view for the embodiment of FIG. 5.
Figure 7:
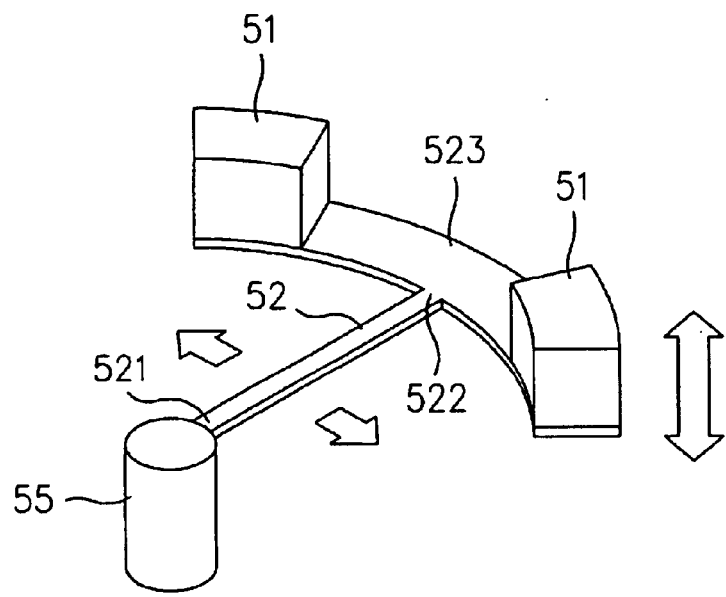
FIG. 7 is an illustration for the vibration of the suspending arm and the platform of the invention.

Please refer FIG. 5 to FIG. 7, which are 3-D outer-appearance views for a preferable embodiment according to the present invention. Wherein, a beam-typed vibratory gyroscope 50, driven by static-electricity and sensing with capacitance manner, has a ring-typed base 54, at center of which a supporting hub 55 is arranged. Plural suspending arms 52, arranged around the supporting hub 55, are extended horizontally with equal altitude in radial direction by taking the supporting hub 55 as center. The arrangement of the suspending arm 52 is at least two or even-numbered. Inside end 521 of the suspending arm 52 is connected to the supporting hub 55. Outside end 522 of the suspending arm 52 is extended horizontally toward two sides by taking the suspending arm 52 as center to form a platform 523. In this preferable embodiment of the invention, four suspending arms 52 are arranged and each suspending arm 52 has a platform 523. Four platforms 523 have same curvature. A discontinuous ring shape is constructed by these platforms 523. There is static-electricity driving electrode 53 arranged corresponding to the platform 523 at the top of the base 54 under the platform 523, which is acted as a static-electricity electrode. Two ends of the top of the platform 523 are respectively arranged a metallic capacitance sensing electrode 51 having an altitude H1. The capacitance sensing electrode 51 is formed on the platform 523 by a micro-electroplating technique. The gyroscope 50 takes the capacitance sensing electrode 51 as an inertia mass block. When the static-electricity driving electrode 53 is driven by a voltage, the suspending arm 52 and the platform 523 are attracted by static-electricity to vibrate in Z direction, and the vibration phase difference between two adjacent suspending arms 52 and the platform 523 is 180 degrees. When the gyroscope 50 is rotated in X direction or Y direction, the suspending arm 52 and the platform 523 generate displacements in X direction or Y direction (as shown in FIG. 7) because of Coriolis force. The capacitance sensing electrodes 51 will generate different values of capacitance, because the distance between two electrodes is changed. The magnitude of the rotary angular speed subjected by gyroscope may be obtained by measuring the change of the capacitance values.

Figure 8:
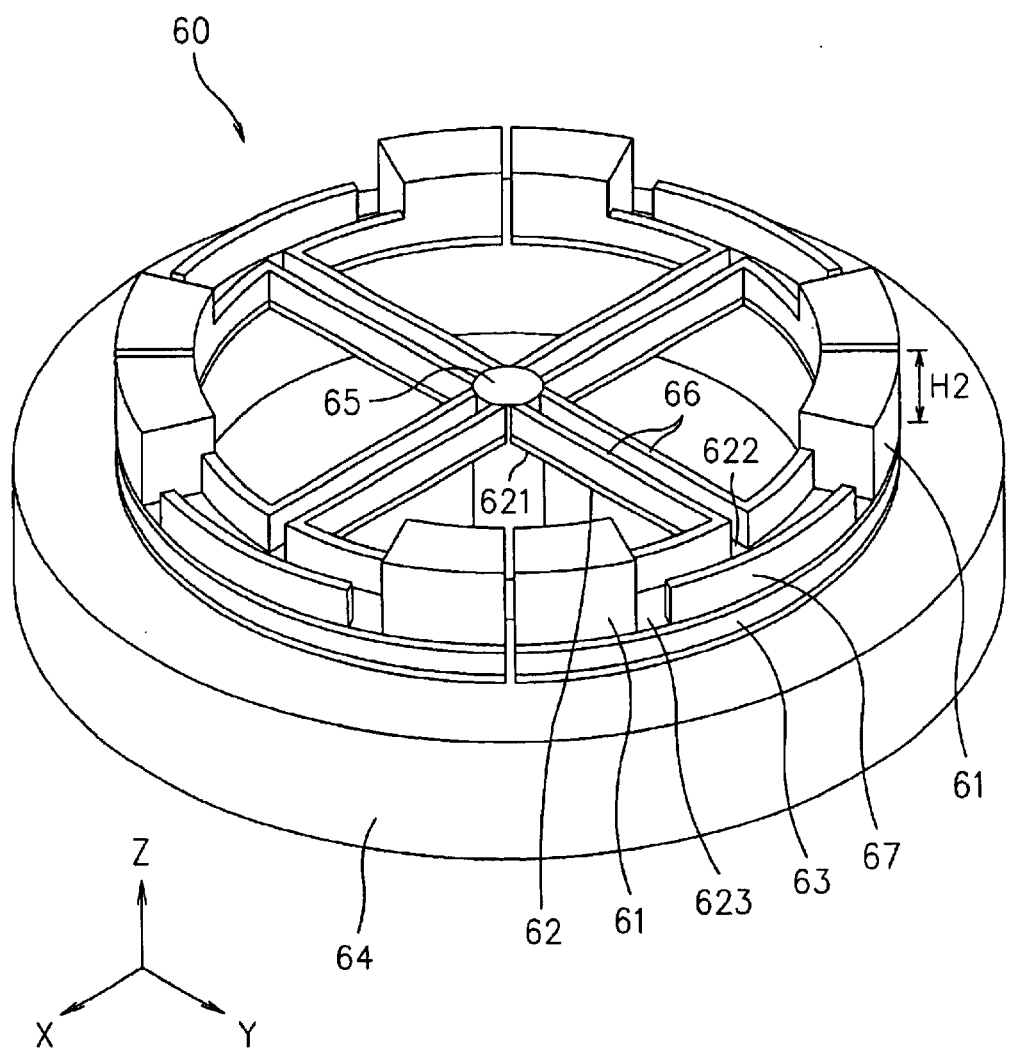
FIG. 8 is a stereo outer-appearance view for another preferable embodiment according to the invention.

Again, please refer to FIG. 8, which is a 3-D outer-appearance view for another preferable embodiment according to the present invention. Wherein, a beam-typed vibratory gyroscope 60, driven by static-electricity and sensing with capacitance method, has a ring-typed base 64, at center of which a supporting hub 65 is arranged. Plural suspending arms 62, arranged around the supporting hub 65, are extended horizontally with equal altitude in radial direction by taking the supporting hub 65 as center. The arrangement of the suspending arm 62 is at least two or even-numbered. Inside end 621 of the suspending arm 62 is connected to the supporting hub 65. Outside end 622 of the suspending arm 62 is extended horizontally toward two sides by taking the suspending arm 62 as center to form a platform 623. In this preferable embodiment of the invention, four suspending arms 62 are arranged and each suspending arm 62 has a platform 623. Four platforms 623 have same curvature. A discontinuous ring shape is constructed by these platforms 623. There is static-electricity driving electrode 63 arranged corresponding to the platform 623 at the top of the base 64 under the platform 623, which is acted as a static-electricity electrode. Two ends of the top of the platform 623 are respectively arranged a metallic capacitance sensing electrode 61 having an altitude H2. The capacitance sensing electrode 61 is formed on the platform 623 by a micro-electroplating technique. The gyroscope 60 takes the capacitance sensing electrode 61 as an inertia mass block. The characteristic of this embodiment is that there are projective reinforcing wall structures 66, 67 arranged at the circumferential edges of the tops of the platform 623 and the suspending arm 62. Wherein, the reinforcing wall structure 66, positioned at two sides of the top of the suspending arm 62, is extended along the inside of the platform 623 and is again connected to the capacitance sensing electrode 61. The reinforcing wall structure 66 is also made of conductive materials. The reinforcing wall structure 66 not only has the function of reinforcement, but also may be acted as information transformation. The reinforcing wall structure 67, positioned at outside of the platform 623, is purely acted as function of reinforcement, so there is no limit for its composing material, but there is one thing needed to notice: the reinforcing wall structure 67 can not be connected to the capacitance sensing electrode 61. In this preferable embodiment of the invention, when the static-electricity driving electrode 63 is driven by a voltage, the suspending arm 62 and the platform 623 are attracted by static-electricity to vibrate in Z direction, and the vibration phase difference between two adjacent suspending arms 62 and the platform 623 is 180 degrees. When the gyroscope 60 is rotated in X direction or Y direction, the suspending arm 62 and the platform 623 generate displacements in X direction or Y direction because of Coriolis force. The capacitance sensing electrodes 61 will generate different values of capacitance, because the distance between two electrodes is changed. The magnitude of the rotary angular speed subjected by gyroscope may be obtained by measuring the change of the capacitance values.

Figure 9:
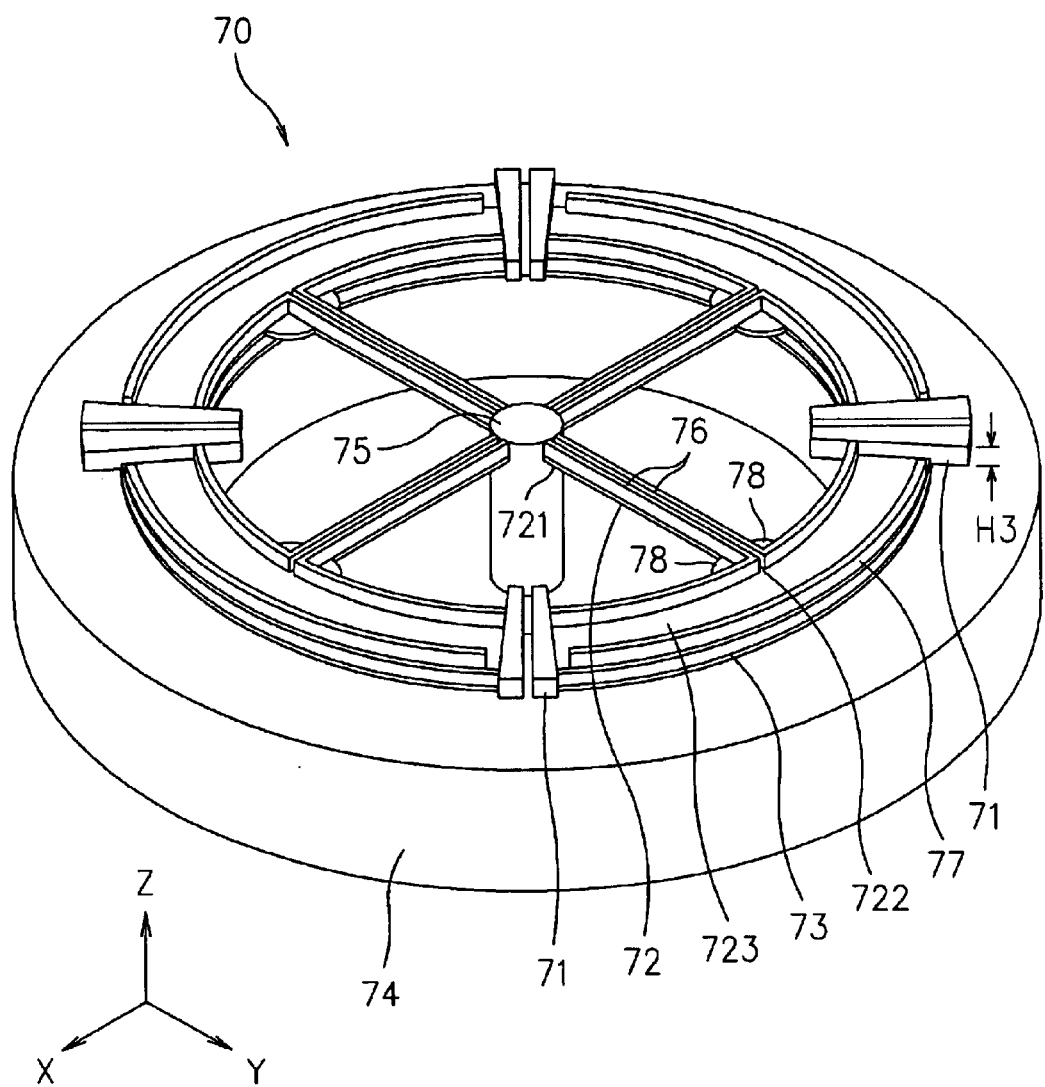
FIG. 9 is a stereo outer-appearance view for further another preferable embodiment according to the invention.

Again, please refer to FIG. 9, which is another preferable embodiment according to the present invention. The contour of the gyroscope 70 is similar to that of the gyroscope 60 shown in FIG. 8. The gyroscope 70, driven by static-electricity and sensing with capacitance manner, has a ring-typed base 74, at center of which a supporting hub 75 is arranged. Plural suspending arms 72, arranged around the supporting hub 75, are extended horizontally with equal altitude in radial direction by taking the supporting hub 75 as center. The arrangement of the suspending arm 72 is at least two or even-numbered. Inside end 721 of the suspending arm 72 is connected to the supporting hub 75. Outside end 722 of the suspending arm 72 is extended horizontally toward two sides by taking the suspending arm 72 as center to form a platform 723. There is reinforcing piece 78 arranged at the joining place of the suspending arm 72 and the platform 723. In this preferable embodiment of the invention, four suspending arms 72 are arranged and each suspending arm 72 has a platform 723. Four platforms 723 have same curvature. A discontinuous ring shape is constructed by these platforms 723. There is static-electricity driving electrode 73 arranged corresponding to the platform 723 at the top of the base 74 under the platform 723, which is acted as a static-electricity electrode. Two ends of the top of the platform 723 are respectively arranged a metallic capacitance sensing electrode 71 having an altitude H3. The capacitance sensing electrode 71 is shown as stripe shape and its two ends are slightly projected out of the edge of the platform 723. The capacitance sensing electrode 71 is formed on the platform 723 by a micro-electroplating technique. The gyroscope 70 takes the capacitance sensing electrode 71 as an inertia mass block. There are projective reinforcing wall structures 76, 77 arranged at the circumferential edges of the tops of the platform 723 and the suspending arm 72. Wherein, the reinforcing wall structure 76, positioned at two sides of the top of the suspending arm 72, is extended along the inside of the platform 723 and is again connected to the capacitance sensing electrode 71. The reinforcing wall structure 76 is also made of conductive materials. The reinforcing wall structure 76 not only has the function of reinforcement, but also may be acted as information transformation. The reinforcing wall structure 77, positioned at outside of the platform 723, is purely acted as function of reinforcement, so there is no limit for its composing material, but there is one thing needed to notice: the reinforcing wall structure 77 can not be connected to the capacitance sensing electrode 71. When the static-electricity driving electrode 73 is driven by a voltage, the suspending arm 72 and the platform 723 are attracted by static-electricity to vibrate in Z direction, and the vibration phase difference between two adjacent suspending arms 72 and the platform 723 is 180 degrees. When the gyroscope 70 is rotated in X direction or Y direction, the suspending arm 72 and the platform 723 generate displacements in X direction or Y direction because of Coriolis force. The capacitance sensing electrodes 71 will generate different values of capacitance, because the distance between two electrodes is changed. The magnitude of the rotary angular speed subjected by gyroscope may be obtained by measuring the change of the capacitance values.

Figure 10A:
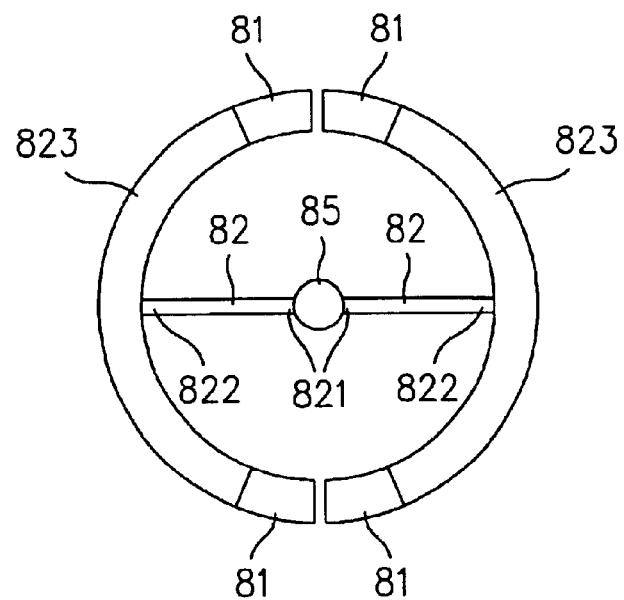
FIG. 10A and FIG. 10B are illustrations for other executing embodiments according to the invention.
Figure 10B:
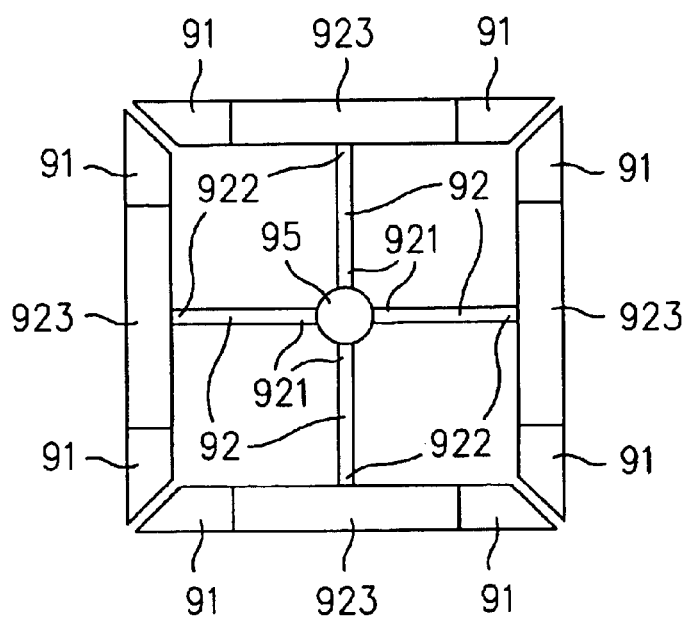

Additionally, it must be pointed out is that the arranging manners for suspending arm, platform, and capacitance sensing electrode according to the present invention are not restricted to the patterns shown in aforementioned drawings, but the capacitance sensing electrode and the static-electricity driving electrode may be interchanged between each other. As shown in FIG. 10A, two suspending arms 82 are symmetrically arranged at two radial sides of the supporting hub 85. Inside end 821 of the suspending arm 82 is connected to the supporting hub 85. Outside end 822 of the suspending arm 82 has a platform 823, at top of two sides of which a capacitance sensing electrode 81 is respectively arranged. The platform 823 is substantially shown as semi-circular shape. A discontinuous ring type is constructed by two platforms 823. Furthermore, as shown in FIG. 10B, four suspending arms 92 are symmetrically (i.e., with equal angles) arranged in four radial directions of the supporting hub 95. The inside end 921 of the suspending arm 92 is connected to the supporting hub 95. The outside end 922 of the suspending arm 92 has a platform 923, at top of two sides of which a capacitance sensing electrode 91 is respectively arranged. The platform 923 is shown as stripe shape. A discontinuous equilateral square shape is constructed and surrounded by four platforms 923. As shown in aforementioned two embodiments, the principle for arranging the suspending arms of the invention is that they are arranged at least two and even-numbered. The suspending arm is extended outwardly in radial direction by taking the supporting arm as center with equal horizontal altitude. The platform may be shown as arc shape or stripe shape. No matter what shape of platform is, the center of the platform is arranged at outside end of the suspending arm, and extensive directions of both platform and suspending arm are substantially vertical to each other and shown as a "T" shape. A capacitance sensing electrode is respectively arranged at tops of two side ends of the platform. The capacitance sensing electrodes are symmetrically arranged with respect to the axial center of the suspending arm or the center of the platform.

In summarizing aforementioned description, the invention has following advantages:

1. Since the structure is symmetrical, so the invention has a double-axial sensing capability in both X direction and Y direction.

2. Since the structure is symmetrical, so the invention has excellent stability and resistance to the environmental noise and vibration for promoting the sensing performance.

3. The invention may be adapted for mass production by MEMS technology, such that its cost is lowered down.

4. Its entire size may be smaller than 1 mm$^2$, and there is no other special manufacturing technology needed.

5. Since the invention has the characteristic that the sensing mode frequency is close to the driving mode frequency, so its sensing sensitivity may be increased greatly.

However, the aforementioned description is just several preferable embodiments according to the invention and, of course, can not limit the executive range of the invention, so any equivalent variation and modification made according to the claims claimed by the invention are all still belonged to the field covered by the patent of the present invention. Please your esteemed members of reviewing committee examine the present application in clear way and grant it as a formal patent as favorably as possible.

What is claimed is:

1. A vibratory double-axially sensing micro-gyroscope, which includes:
 a base, center of which is arranged a supporting hub;
 plural suspending arms, which are arranged around the supporting hub and are extended outwardly in radial direction by taking the supporting hub as center;
 a platform, which is arranged at an outside end of a suspending arm and is extended toward two sides horizontally by taking the suspending arm as center;
 static-electricity driving electrode, which is arranged below the platform at a top of the base corresponding to the platform;

plural capacitance sensing electrodes, which are arranged at a top of the platform; and reinforcing wall structure is arranged at an inside of the platform and extended toward two sides of a top of the suspending arm, and the reinforcing wall structure is connected to a capacitance sensing electrode, and another reinforcing wall structure is also arranged at an outside of the platform and is not connected to the capacitance sensing electrode.

2. The vibratory double-axially sensing micro-gyroscope according to claim 1, wherein the capacitance sensing electrodes are formed at tops of two sides of the platform by micro-electroplating technique.

3. The vibratory double-axially sensing micro-gyroscope according to claim 1, wherein the suspending arms are positioned at same altitude and are parallel to the base.

4. The vibratory double-axially sensing micro-gyroscope according to claim 1, wherein at least two or even-numbered suspending arms are arranged.

5. The vibratory double-axially sensing micro-gyroscope according to claim 1, wherein the platform is extended symmetrically toward two sides of the suspending arm by taking the axial center of the suspending arm as center.

6. The vibratory double-axially sensing micro-gyroscope according to claim 1, wherein the platform is shaped as an arc having curvature and a discontinuous ring shape is constructed by the platform.

7. The vibratory double-axially sensing micro-gyroscope according to claim 1, wherein the platform is formed as stripe shape and a discontinuous equilateral shape is constructed by the platform.

8. A vibratory double-axially sensing micro-gyroscope, which includes:

a base, center of which is arranged a supporting hub;

plural suspending arms, which are arranged around the supporting hub and are extended outwardly in radial direction by taking the supporting hub as center;

a platform, which is arranged at an outside end of a suspending arm and is extended toward two sides horizontally by taking the suspending arm as center;

static-electricity driving electrode, which is arranged below the platform at a top of the base corresponding to the platform; plural capacitance sensing electrodes, which are arranged at a top of the platform, wherein a reinforcing piece is arranged at joining place of both the suspending arm and the platform.

9. A vibratory double-axially sensing micro-gyroscope, which includes:

a base, center of which is arranged a supporting hub;

plural suspending arms, which are arranged around the supporting hub and are extended outwardly in radial direction by taking a supporting pillar as center;

a platform, which is arranged at an outside end of a suspending arm and is extended toward two sides horizontally by taking the suspending arm as center;

capacitance sensing electrode, which is arranged below the platform at a top of the base corresponding to the platform;

plural static-electricity driving electrodes, which are arranged at a top of the platform; and a reinforcing piece is arranged at joining place of both the suspending arm and the platform.

10. The vibratory double-axially sensing micro-gyroscope according to claim 9, wherein the static-electricity driving electrodes are formed at tops of two sides of the platform by plating method.

11. The vibratory double-axially sensing micro-gyroscope according to claim 9, wherein the suspending arms are positioned at same altitude and are parallel to the base.

12. The vibratory double-axially sensing micro-gyroscope according to claim 9, wherein at least two or even-numbered suspending arms are arranged.

13. The vibratory double-axially sensing micro-gyroscope according to claim 9, wherein the platform is extended symmetrically toward two sides of the suspending arm by taking an axial center of the suspending arm as center.

14. The vibratory double-axially sensing micro-gyroscope according to claim 9, wherein the platform is shaped as an arc having curvature and a discontinuous ring shape is constructed by the platform.

15. The vibratory double-axially sensing micro-gyroscope according to claim 9, wherein the platform is formed as stripe shape and a discontinuous equilateral shape is constructed by the platform.

16. A vibratory double-axially sensing micro-gyroscope which includes:

a base, center of which is arranged a supporting hub;

plural suspending arms, which are arranged around the supporting hub and are extended outwardly in radial direction by taking a supporting pillar as center;

a platform, which is arranged at an outside end of a suspending arm and is extended toward two sides horizontally by taking the suspending arm as center;

capacitance sensing electrode, which is arranged below the platform at a top of the base corresponding to the platform;

plural static-electricity driving electrodes, which are arranged at a top of the platform; and reinforcing wall structure is arranged at an inside of the platform and extended toward two sides of the top of the suspending arm, and the reinforcing wall structure is connected to a static-electricity driving electrode, and another reinforcing wall structure is also arranged at an outside of the platform and is not connected to the static-electricity driving electrode.

17. The vibratory double-axially sensing micro-gyroscope according to claim 8, wherein the capacitance sensing electrodes are formed at tops of two sides of the platform by micro-electroplating technique.

18. The vibratory double-axially sensing micro-gyroscope according to claim 8, wherein the suspending arms are positioned at same altitude and are parallel to the base.

19. The vibratory double-axially sensing micro-gyroscope according to claim 16, wherein the static-electricity driving electrodes are formed at tops of two sides of the platform by plating method.

20. The vibratory double-axially sensing micro-gyroscope according to claim 16, wherein the suspending arms are positioned at same altitude and are parallel to the base.

* * * * *